Feb. 9, 1960     C. F. TAYLOR     2,924,498
DEW METER
Filed Jan. 10, 1957
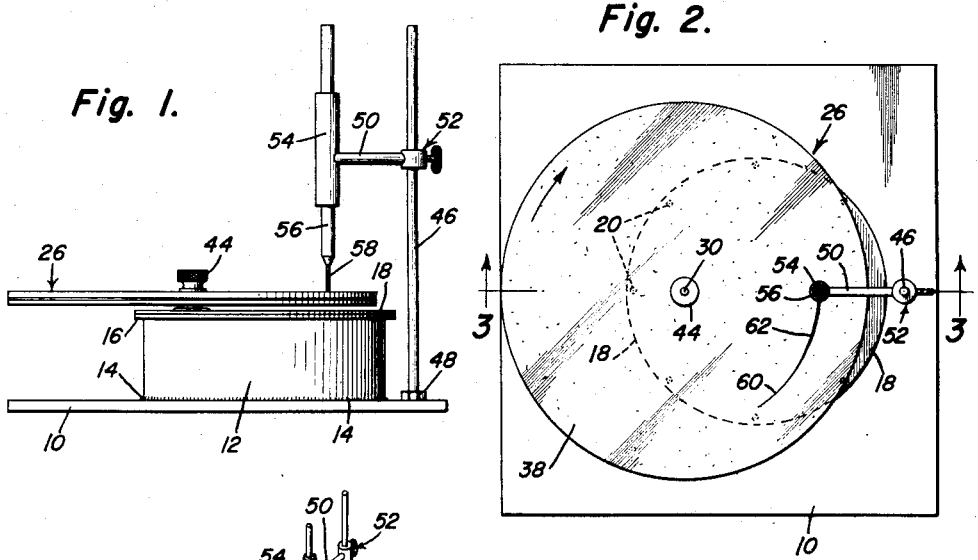
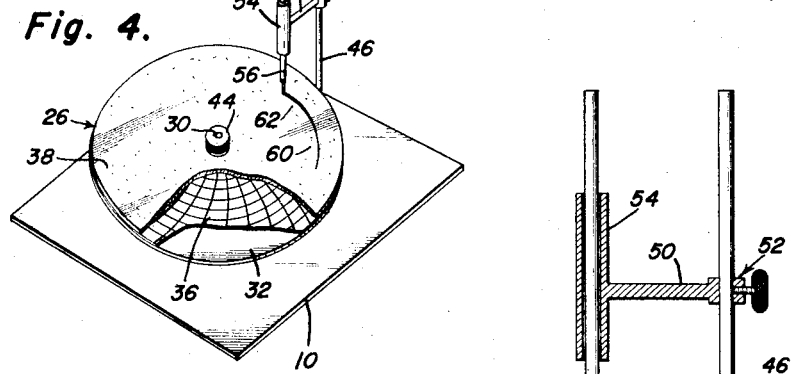
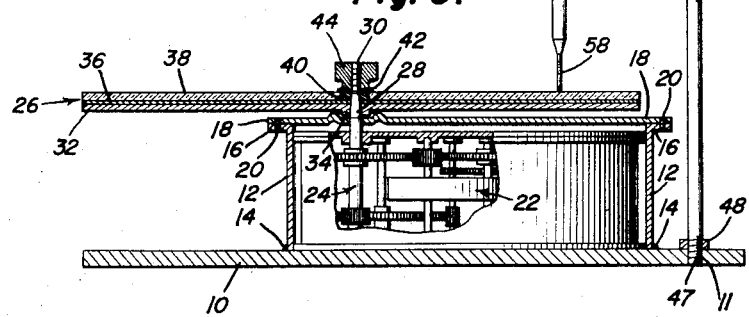
INVENTOR.
Carlton F. Taylor
BY
ATTORNEY

United States Patent Office 2,924,498
Patented Feb. 9, 1960

2,924,498

DEW METER

Carlton F. Taylor, University Park, Pa., assignor to the United States of America as represented by the Secretary of the Army Application January 10, 1957, Serial No. 633,511

8 Claims. (Cl. 346—121)

(Granted under Title 35, U.S. Code (1952), sec. 266)

The invention described herein may be manufactured and used by or for the Government of the United States of America for governmental purposes without the payment to me of any royalty thereon.

This application is a continuation-in-part of my application Serial No. 357,393 filed May 25, 1953, now abandoned.

This invention relates to meteorological instruments generally, and specifically to a device for measuring and recording the duration of time that moisture is present on a surface.

It is an object of this invention to provide a device for measuring and recording the length of time that moisture caused by dew or rain is present on a surface.

It is another object of this invention to provide an instrument which measures and records the duration of time that moisture is present on a surface over a fixed period of time, such as twenty-four hours.

In making agricultural studies it is important to know the atmospheric conditions which exist while plant diseases are developed or occur. One of the atmospheric conditions which it is important to know is the amount of time a film of moisture has been present on the plants under investigation. Due to the nature of the field conditions attendant to making agricultural studies, it is necessary that instruments employed be non-electrical and that they require only periodic attention. This invention was made to satisfy this need.

The above and other objects of the invention will become apparent from the following disclosure taken in connection with the drawings wherein:

Fig. 1 represents a side elevation view of the device.
Fig. 2 is a plan view of the device.
Fig. 3 is a sectional view taken on line 3—3 of Fig. 2.
Fig. 4 is a perspective view of the device.

Referring to drawings, the device, which I call a "dew meter," comprises a base 10 and an annular housing 12 secured thereto by weld 14 or equivalent securing means. Housing 12 has an annular flange 16 formed at its upper end that constitutes a seat for circular closure 18, which is secured thereto by studs 20 or their equivalent (Fig. 3). The base 10, housing 12 and closure 18 may be made of metal or non-metal, aluminum being well suited. Within the compartment formed by housing 12, closure 18 and a portion of the base 10, is housed a conventional clock, indicated generally by reference numeral 22. The specific structure of the clock 22, per se, does not constitute my invention, therefore a detailed disclosure of the clock structure will not be made herein. The only part of the clock structure which is modified in any way is the shaft 24 which would normally drive the hands of the clock, but which in my dew meter drives a chart assembly indicated generally by reference numeral 26. As can best be seen in Fig. 3, the drive shaft 24 is tapered near its upper end at 28, and threaded at its upper extremity 30.

The chart assembly 26 comprises disk 32 of sheet metal, aluminum being well suited, having a hub portion 34 that is adapted to be fitted onto the tapered portion 28 of the drive shaft 24 sufficiently tight to provide a friction drive therebetween, a standard chart 36 of the same diameter as disk 32, which is positioned on top of said disk, and a disk 38 of glass having its upper surface sand blasted, which is positioned on top of said chart. The central portion of glass disk 38 is apertured and receives mounting hub 40 made of non-glass. Washer 42 is placed on top of glass disk 38 and its hub, and nut 44 is mounted on the threaded end 30 of drive shaft 24 sufficiently tight to maintain all the components of chart assembly 26 in assembled relation so that they will rotate as a unit with the drive shaft when the drive shaft is rotated by the clock 22. The exterior of nut 44 is knurled to permit manual adjustment thereof.

The dew meter includes structure for positioning a marking implement. A vertical rod 46 is secured to base 10 toward one side thereof in any conventional manner. For purposes of illustration, the lower extremity 47 of rod 46 is shown as being threaded and mounted in threaded opening 11 in base 10. The rod is locked in place by a conventional lock nut 48. Horizontally disposed rod 50 has a conventional clamp, indicated generally by reference numeral 52, formed at one end which permits it to be secured to vertical rod 50 by manual manipulation in a conventional manner. The other end of rod 50 has a sleeve 54 secured thereto. Sleeve 54 has its opening disposed in a vertical plane and is adapted to loosely receive a marking implement 56. In the preferred form, marking implement 56 is a pencil known in the trade as "indelible." The particular pencil used in this instance was an Eberhard Faber Mongol, Purple, No. 844, but any pencil of this type is obviously satisfactory. The core 58 of these indelible pencils comprises methyl violet, to impart color, gum tragacanth or other gum as a bodying substance and graphite. The latter serves to impart the usual lead pencil line under dry conditions. Upon wetting or attempts at erasing, the gum and methyl violet dissolve or smear making complete erasure difficult or impossible. For the purposes of the present invention, the graphite would serve little purpose and the methyl violet and gum alone would serve equally well. The only difference observable would be that under dry conditions practically no line would be seen. When dew fell, however, the dye and gum would dissolve and the usual purple line would become evident.

In the preferred form of my invention, the clock 22 is of the twenty-four hour type, that is, the drive shaft 24 makes one complete rotation in twenty-four hours. The chart 36 is appropriately marked and correlated so that it corresponds to a twenty-four hour period with appropriate marks for sub-divisions of time. The dew meter operates in the following manner: the marking implement 56 is positioned in sleeve 54, and the arm 50 adjusted to bring the tip of the marking implement over the appropriate point on chart 36. The clock 22 is actuated, and it rotates the drive shaft 24, which in turn rotates the chart assembly 26. The marking implement 56 is slidable within the sleeve 54, therefore the tip of its core 58 rests against the upper surface of the glass disk 38 due to the force of gravity. Assuming that there is no moisture present in the locale of the dew meter, and specifically on the surface of glass disk 38, a thin line will be formed on the upper surface of the glass disk because of the pressure on the tip of the core 58 which is caused by the weight of the marking implement 56. The fine line is indicated in Figs. 2 and 4 by reference numeral 60. At the point in time when moisture is deposited on the upper surface of the glass disk 32, the tip of the core 58, which contacts the moisture and glass disk 38, dissolves and makes a thick line, which is indicated in Figs. 2 and 4 by reference numeral 62. The tip of core 58 continues to make a thick line until the upper surface of the disk 38 is dry, when the normal, thin line commences and continues to be made as the chart assembly 36 continues to rotate.

After the twenty-four hour period has expired it is possible to determine the periods of time during which moisture was present on the upper surface of the glass disk 38 by merely observing on the chart the period of time covered by the heavy markings 62. When utilizing the dew meter in making agricultural studies, it is usually placed in the field and is exposed to the elements. Moisture may be caused by either dew or rain being deposited on the glass disk 38. When used under these conditions, it will be apparent that a source of electricity is not always available and that therefore a non-electrical device is desirable. Furthermore, since many dew meters may be used simultaneously at different locations, it is also desirable that they require only periodic attention. By utilizing my dew meter it is only necessary that the upper surface of glass disk 28 be cleaned and the clock wound every twenty-four hours.

From the above, it will be apparent that my dew meter is very useful in making meteorological measurements and recordings, and specifically to measure and record the duration of the presence of moisture on plants, which is necessary in making agricultural studies. It will also be apparent that my dew meter fulfills each and every object of this invention.

I claim:

1. A device for recording the time and duration of deposition of a thin film of atmospheric moisture comprising a record surface, means for positioning a marking instrument thereover, said marking instrument having a solid marking core of water soluble material comprising a water soluble dye and a gum in contact with said surface, driving means connected to said surface for producing uniform timed motion between said marking instrument and said surface.

2. A device in accordance with claim 1 wherein said surface is a rotatable disc.

3. A device in accordance with claim 2 wherein said disc is made of glass having a ground surface.

4. A device in accordance with claim 1 wherein said driving means comprises a spring motor.

5. A device in accordance with claim 1 wherein said marking instrument is perpendicularly disposed to said surface.

6. A device in accordance with claim 3 wherein said disc is combined with a circular chart which is radially calibrated to indicate the duration of time.

7. A device in accordance with claim 1 wherein the dye is methyl violet.

8. A device in accordance with claim 7 wherein the gum is gum tragacanth.

References Cited in the file of this patent
UNITED STATES PATENTS

| | | |
|---|---|---|
| 56,180 | Clark | July 10, 1866 |
| 763,091 | Dodsworth | June 21, 1904 |
| 1,572,207 | Hodgkinson | Feb. 9, 1926 |
| 2,139,492 | Fidelman | Dec. 6, 1938 |
| 2,307,932 | Larson | Jan. 12, 1943 |